US008495238B1

(12) United States Patent  
Banerjee et al.

(10) Patent No.: US 8,495,238 B1
(45) Date of Patent: Jul. 23, 2013

(54) FACILITATING SELF-TUNING TRAFFIC SHAPING WITHOUT A CENTRAL TRAFFIC MANAGER

(75) Inventors: Ashok Banerjee, Fremont, CA (US); Radhika Lakshmanan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 631 days.

(21) Appl. No.: 12/128,271

(22) Filed: May 28, 2008

(51) Int. Cl.
*G06F 15/173* (2006.01)
*G06F 15/16* (2006.01)

(52) U.S. Cl.
USPC .......................... 709/233; 709/223; 709/232

(58) Field of Classification Search
USPC ............... 709/233, 223, 232, 225, 226, 235; 370/395.4; 711/113; 718/104; 726/12
See application file for complete search history.

(56) References Cited

U.S. PATENT DOCUMENTS

| | | | | |
|---|---|---|---|---|
| 6,842,783 | B1 * | 1/2005 | Boivie et al. | 709/225 |
| 6,853,642 | B1 * | 2/2005 | Sitaraman et al. | 370/395.4 |
| 7,313,627 | B1 * | 12/2007 | Noble | 709/233 |
| 7,397,759 | B2 * | 7/2008 | Tan et al. | 370/216 |
| 7,477,601 | B1 * | 1/2009 | Waclawsky et al. | 370/232 |
| 7,653,741 | B2 * | 1/2010 | Mazzitelli | 709/235 |
| 7,711,956 | B2 * | 5/2010 | Kinoshita et al. | 713/168 |
| 2003/0101265 | A1 * | 5/2003 | Dantzig et al. | 709/226 |
| 2004/0044846 | A1 * | 3/2004 | Matthews et al. | 711/113 |
| 2005/0257258 | A1 * | 11/2005 | Kinoshita et al. | 726/12 |
| 2006/0235991 | A1 * | 10/2006 | Brown et al. | 709/233 |
| 2008/0250419 | A1 * | 10/2008 | Kasten et al. | 718/104 |

* cited by examiner

*Primary Examiner* — Aaron Strange
(74) *Attorney, Agent, or Firm* — King & Spalding LLP

(57) ABSTRACT

One embodiment of the present invention provides a system that facilitates self-tuning traffic shaping without a central traffic manager. During operation, the system sends one or more requests from a client to a server over a specified period of time. Next, the system receives one or more responses to the requests from the server over the specified period of time. The system then determines a request-timeout percentage for the period of time. Finally, the system adjusts a rate at which requests are sent to the server based on the request-timeout percentage.

17 Claims, 3 Drawing Sheets

FACILITATING SELF-TUNING TRAFFIC SHAPING WITHOUT A CENTRAL TRAFFIC MANAGER

BACKGROUND

1. Field of the Invention

The present invention relates to client-server applications. More specifically, the present invention relates to a method and an apparatus for facilitating self-tuning traffic shaping without a central traffic manager.

2. Related Art

As web-based services continue to grow, so does the number of requests that each server typically handles in a client-server environment. If more requests are sent to the server than the server can handle, requests will typically time out. Often times, the effect of these timeouts on the entire system is worse than if each client withheld some requests so that the server would not be overloaded.

Many varieties of traffic shapers have been introduced to help optimize the flow of such requests to the server. A typical traffic shaper will not allow requests to be sent to the server at a rate faster than that at which the server can process them. However, forwarding all requests through a traffic shaper can create a bottleneck into the system, and can create a single point of failure.

Another type of traffic shaper uses intra-client communication to enable multiple clients to collaborate with each other while sending requests to the server. These systems can be implemented using various techniques. However, they all typically consume a significant amount of bandwidth and management overhead, which may be scarce in the current environment.

SUMMARY

One embodiment of the present invention provides a system that facilitates self-tuning traffic shaping without a central traffic manager. During operation, the system sends one or more requests from a client to a server over a specified period of time. Next, the system receives one or more responses to the requests from the server over the specified period of time. The system then determines a request-timeout percentage for the period of time. Finally, the system adjusts a rate at which requests are sent to the server based on the request-timeout percentage.

In some embodiments of the present invention, the system sends one or more requests to the server over a second specified period of time. Next, the system receives one or more responses to the requests from the server over the second specified period of time. The system then determines a second request-timeout percentage for the second period of time. The system also determines a throttling effect by analyzing the request-timeout percentage, the second request-timeout percentage, and the rate at which requests are sent to the server. Finally, the system adjusts the rate at which requests are sent to the server based on the second request-timeout percentage and the throttling effect.

In some embodiments of the present invention, the system applies a decay function to the throttling effect, wherein the decay function reduces the influence of the throttling on the adjustment of the rate at which requests are sent to the server.

In some embodiments of the present invention, the system adjusts duration of a subsequent period of time for which a subsequent request-timeout percentage is determined based on the throttling effect.

In some embodiments of the present invention, the system delays a start of a subsequent period of time for which a subsequent request-timeout percentage is determined based on the throttling effect.

In some embodiments of the present invention, if the client has not sent a request to the server, the system waits a predetermined number of time periods before adjusting the rate at which requests are sent to the server.

In some embodiments of the present invention, adjusting the rate at which requests are sent to the server involves adjusting the rate such that the timeout percentage is greater than zero.

DETAILED DESCRIPTION

Figure 1:
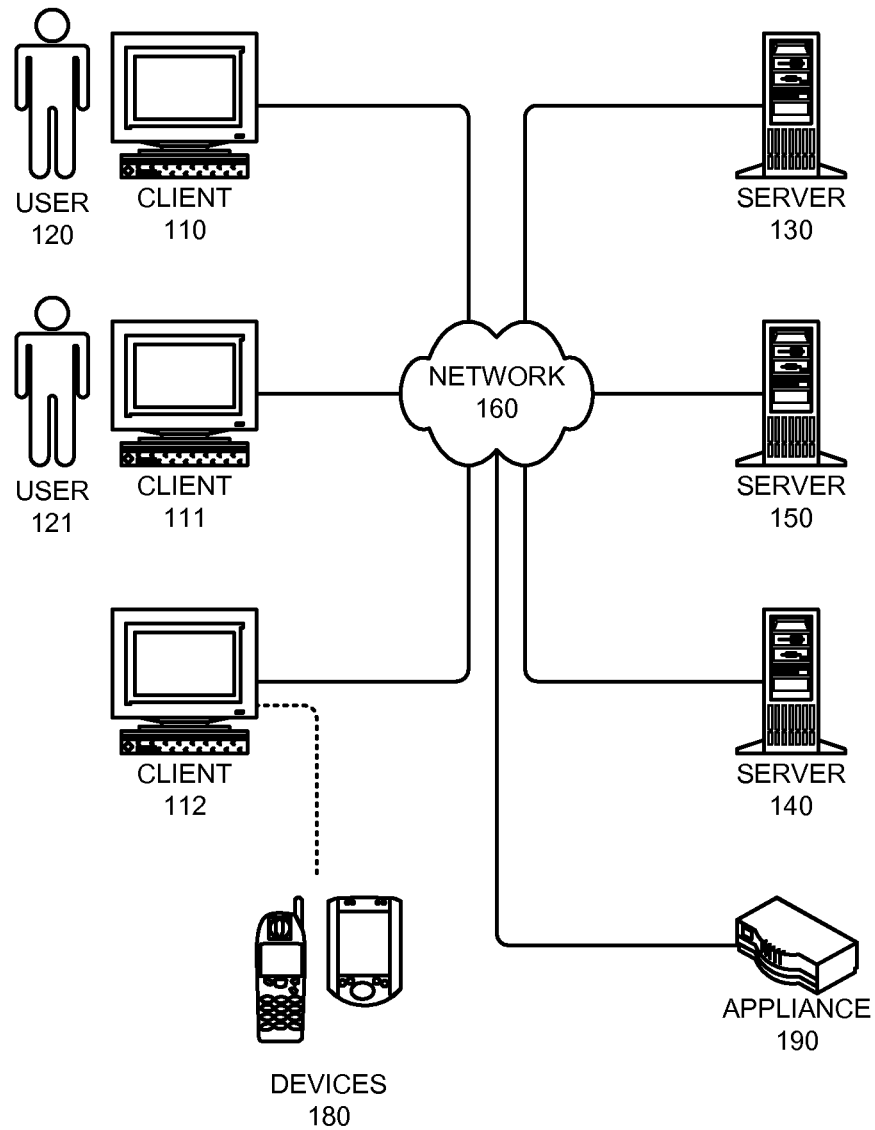
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system that facilitates self-tuning traffic shaping without a central traffic manager, and without intra-client communication. During operation, the system sends one or more requests from a client to a server over a specified period of time. Next, the system receives one or more responses to the one or more requests from the server over the specified period of time. The system then determines a request-timeout percentage for the period of time. Finally, the system adjusts a rate at which requests are sent to the server based on the request-timeout percentage.

Note that the client may attempt to throttle back the number of requests that the client sends to the server based on the request-timeout percentage. For example, if the request-timeout percentage is a very large number, the client may significantly throttle back the rate at which the requests are sent to the client. However, if the request-timeout percentage is very small, the client may only throttle back the rate at which the requests are sent to the client by a small amount.

In some embodiments of the present invention, the system sends one or more requests to the server over a second specified period of time. Next, the system receives one or more responses to the one or more requests from the server over the second specified period of time. The system then determines a second request-timeout percentage for the second period of time. The system also determines a throttling effect by analyzing the request-timeout percentage, the second request-timeout percentage, and the rate at which requests are sent to the server. Note that this throttling effect may include the direct effect of the client adjusting the rate that requests are sent to the server, as well as the effect over other self-tuning clients on the same network. This throttling effect is described in more detail below. Finally, the system adjusts the rate at which requests are sent to the server based on the second request-timeout percentage and the throttling effect.

Note that this throttling effect is important for the entire system. For example, if a client throttles back the number of requests which the client sends to the server, and the resulting request-timeout percentage falls to zero, then the client may have throttled back way too much. In this example, the client is potentially holding on to requests while the server has potential unused capacity for processing those requests.

Examining the throttling effect also allows the client to better understand how the system is operating in regards to other clients. For example, if each time a client adjusts the rate at which the client sends requests to the server, the client observes a massive oscillation in the throttling effect, then the client may infer that there exists at least one more client in the system that is attempting to shape traffic in the same manner. In this example, the client may take action to compensate for the actions of the other client. Such actions are described in more detail below.

In some embodiments of the present invention, the system applies a decay function to the throttling effect, wherein the decay function reduces over time the influence of the throttling on the adjustment of the rate at which requests are sent to the server. In other words the decay function models the decay of memory in the system. Because the operating environment of client/server systems is constantly changing, it is important to minimize the effects of observed results over time. The more recently an event was observed, the more relevant the event is to the system. This decay helps to minimize the effects of extraordinary observations.

In some embodiments of the present invention, the system adjusts duration of a subsequent period of time for which a subsequent request-timeout percentage is determined based on the throttling effect. For example, if a client is observing a periodic oscillation while analyzing the throttling effect, the client may adjust the length of the period in which the client observes the number of timeouts before making an adjustment.

In some embodiments of the present invention, the system delays a start of a subsequent period of time for which a subsequent request-timeout percentage is determined based on the throttling effect. For example, if a client is observing a request-timeout rate for a period of five minutes, and through observations, the client believes that another client is trying to make adjustments on the same five-minute period, the client may delay the start of the next period so that it is out of phase with the other client.

In some embodiments of the present invention, if the client has not sent a request to the server, the system waits a predetermined number of time periods before adjusting the rate at which requests are sent to the server. Note that this may be particularly useful for a new client that has just been initialized. In some embodiments of the present invention, it is beneficial for a client to wait a certain amount of time before attempting to throttle the rate at which the client sends requests to the server.

In some embodiments of the present invention, adjusting the rate at which requests are sent to the server involves adjusting the rate such that the timeout percentage is greater than zero. Note that an optimal rate may include the lowest possible percentage that is still greater than zero. The idea here is to maximize the amount of requests that are being sent to the server without overloading the server. For example, it may be beneficial for a server to process requests at 100% utilization while only having a few requests time out, rather than either processing requests at 100% utilization and having many requests time out, or processing requests at 95% utilization and having no requests time out.

Exemplary Embodiments

In an exemplary embodiment of the present invention, clients do not communicate with an external system or any other clients to receive any kind of token or request submission rate. Each client relies entirely on what it observes from the response time and timeouts of its own requests. In doing so, each client incurs no management overhead, and generates no additional network traffic by sending intra-client messages or communicating with a traffic manager.

For example, in the last 10 seconds a client sent 50 requests to the server and observed 20 timeouts (a request-timeout percentage of 40%). Based on pre-set thresholds for the request-timeout percentage, the client attempts to compensate when the request-timeout percentage is high. The compensation involves request throttling when the request-timeout percentage is high, and releasing the throttle when the request-timeout percentage is low.

Note that requests may be throttled in proportion to the request-timeout percentage. For example, if the client is configured to compensate at 60% (throttle percent), then 60% of the 30% reported request-timeout percentage implies a throttle back of 18%.

In some embodiments of the present invention, the throttle percentage depends on whether the client observes oscillating characteristics in the throttle. Oscillation implies that the client is being over-throttled, which implies that processing capacity is being wasted.

In the event of over-throttling, the client may lower the percentage of the throttling. If the percentage drops below a pre-determined threshold, this may indicate that too many other clients are actively compensating at the same time, and thus, experiencing adverse spikes at the same time.

Since each client operates with no a priori knowledge of how many other clients are actively trying to shape traffic, and because each client is self-tuning, as new clients are started the system will converge to the correct state by itself. The ability of the system to throttle in a self-tuned manner in a distributed network of clients, without the clients communicating with each other or with a central traffic manager, is a major advantage over existing traffic-shaping systems, because the system does not incur any management overhead and does not consume any additional bandwidth for the purpose of traffic-shaping.

Embodiments of the present invention may be particularly suited for grid-based systems or peer-to-peer (P2P) systems, wherein a large number of clients or servers may be introduced into, or removed from, the system at any time, and wherein the management overhead of hand-tuning all of these servers may be prohibitive.

In some embodiments of the present invention, m systems in the network practice this tuned-throttling, while n other systems do not actively shape traffic. In these embodiments, the m active traffic shaping participants will have a beneficial and desired effect on the traffic flow. However if n is significantly greater than m in terms of traffic contribution, then such a system may not stabilize despite strong attempts by the m active traffic shaping clients.

In some embodiments of the present invention, prior to attempting to shape the traffic, the system is observed with a "period" using an exponential decay model for memory of traffic. Using exponential decay, the throttle system observes the traffic pattern, but will operate with a decay factor, say a half-life of two minutes. In short, only one half of what happened two minutes ago still matters. Such a system values recent events/observations more and converges more rapidly to the optimal steady state. At the same time, the half-life modeling prevents the system from over-responding to minor blips which are self correcting. In some embodiments of the present invention, the client will attempt to throttle the load only if the exponential decay model still suggests that the timeout percentage is too high. In some embodiments the entire model may run with a filter which completely filters out occasional blips of timeouts (more of filter for medianness).

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different configurations, and are not limited to the configuration illustrated in computing environment 100. Any device that is capable of communicating via network 160 may incorporate elements of the present invention.

Process of Self-Tuning

Figure 2:
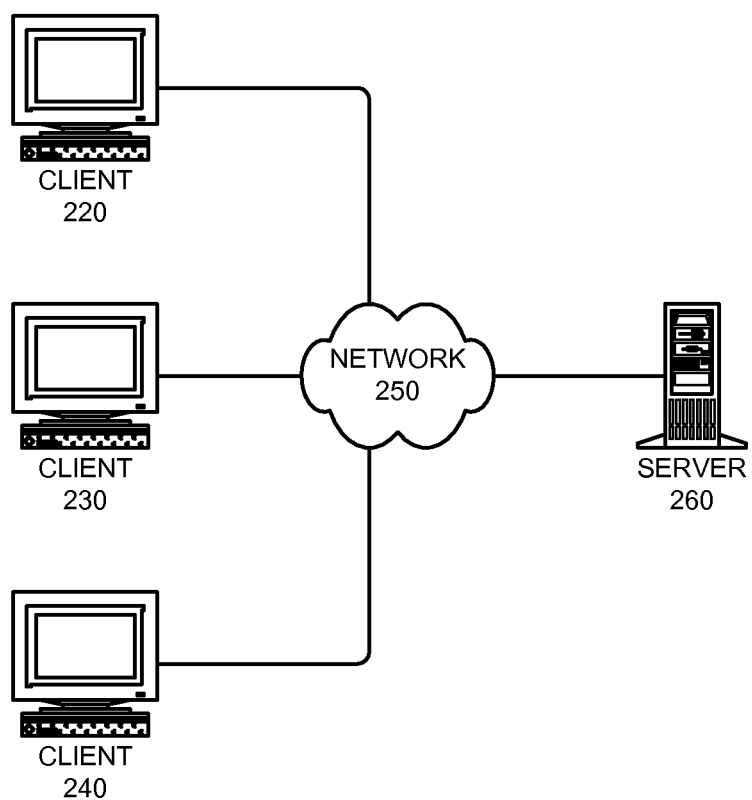
FIG. 2 illustrates a self-tuning computing environment in accordance with an embodiment of the present invention.

FIG. 2 illustrates a self-tuning computing environment 200 in accordance with an embodiment of the present invention. Self-tuning computing environment 200 comprises clients 220-240, network 250, and server 260. Note that self-tuning computing environment 200 can comprise any number of clients and servers coupled in any number of ways, and are not limited to the embodiment pictured in FIG. 2.

Figure 3:
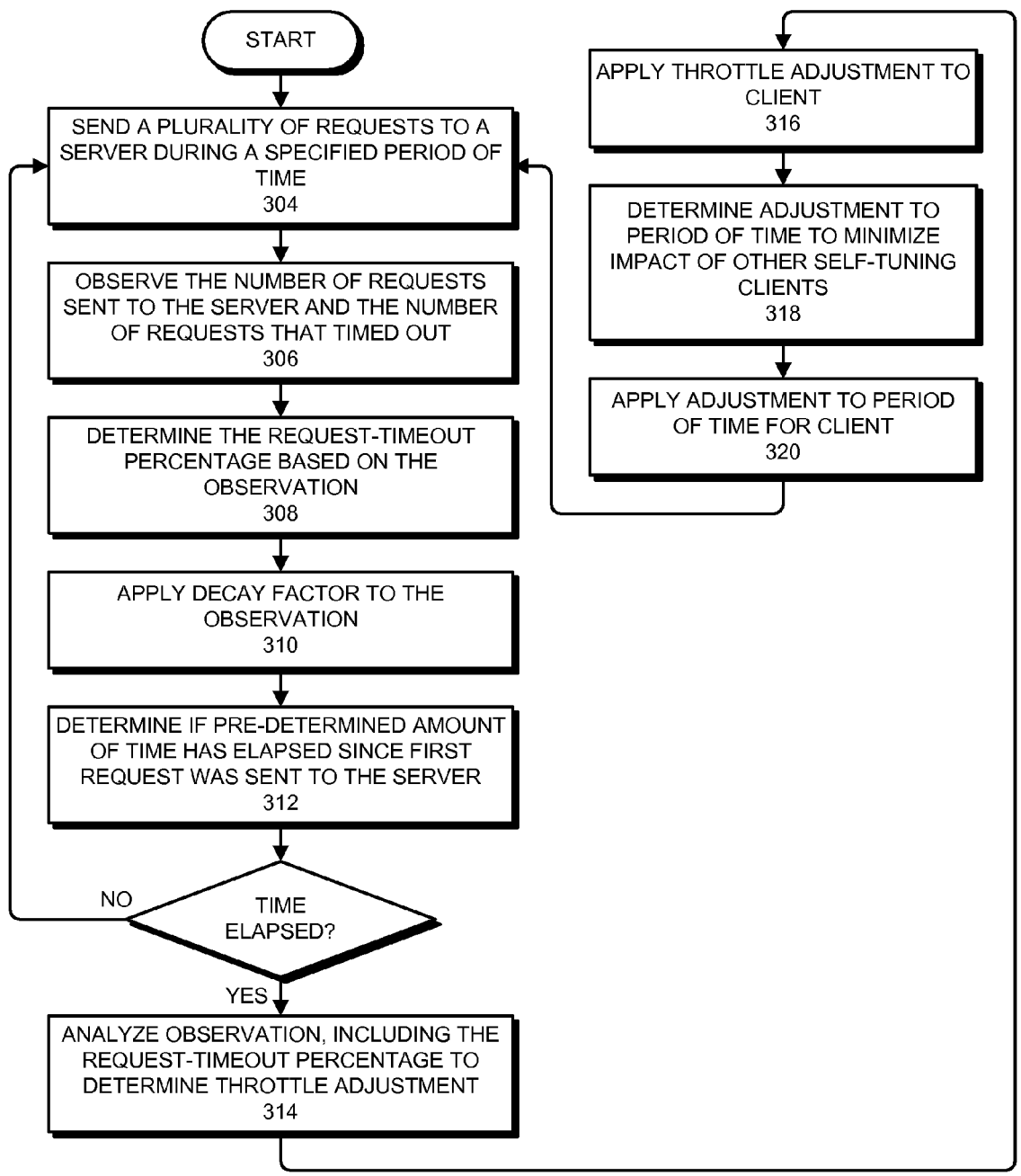
FIG. 3 presents a flow chart illustrating the process of self-tuning in accordance with an embodiment of the present invention.

FIG. 3 presents a flow chart illustrating the process of self-tuning in accordance with an embodiment of the present invention. During operation, a client, such as client 220 sends a plurality of requests to a server, such as server 260 (operation 304). Next, client 220 observes the requests sent to server 260, and the number of those requests that timed out (operation 306). Client 220 then determines a request-timeout percentage based on the observation (operation 308). Client 220 optionally applies a decay factor to the observation to reduce the effect of the observation over time (operation 310).

Client 220 then determines if a predetermined amount of time has elapsed since client 220 first sent a request to server 260 (operation 312). If not, the client continues with operation 304 because client 220 does not have enough observation-history to effectively shape traffic in self-tuning computing environment 200. However, if so, client 220 then analyzes the observation, including the request-timeout percentage to determine a throttle adjustment (operation 314).

Next, client 220 applies the throttle adjustment (operation 316). Client 220 then determines an adjustment to the period of time to minimize the impact of other self-tuning clients, such as clients 230 and 240, in self-tuning computing environment 200 (operation 318). Note that these adjustments may include changing the duration of the period of time or the phase of the period of time as described previously.

Also note that the presence of clients 230 and 240 may be detected by observing oscillations between throttle adjustments that are greater than would typically be caused by implementing the throttle adjustments from only a single client.

Finally, client 220 applies the adjustment to the period of time (operation 320). Note that in some instances, client 220 may not make any adjustments to the period of time if no other self-tuning clients are detected.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method of facilitating self-tuning traffic shaping without a central traffic manager, the method comprising:
    sending one or more requests from a client to a server over a first specified period of time;
    receiving at the client one or more responses to the one or more requests from the server over the first specified period of time;
    determining at the client a first request-timeout percentage for the server for the first specified period of time;
    adjusting at the client a rate at which requests are sent to the server based on the first request-timeout percentage;
    sending one or more requests to the server over a second specified period of time;
    receiving one or more responses to the one or more requests from the server over the second specified period of time;
    determining a second request-timeout percentage for the second specified period of time;
    determining a throttling effect by analyzing the first request-timeout percentage, the second request-timeout percentage, and the rate at which requests are sent to the server; and
    further adjusting the rate at which requests are sent to the server based on the second request-timeout percentage and the throttling effect.

2. The method of claim 1, further comprising applying a decay function to the throttling effect, wherein the decay function reduces over time the influence of the throttling effect on the adjustment of the rate at which requests are sent to the server.

3. The method of claim 1, further comprising adjusting a duration of a subsequent period of time for which a subsequent request-timeout percentage is determined based on the throttling effect.

4. The method of claim 1, further comprising delaying a start of a subsequent period of time for which a subsequent request-timeout percentage is determined based on the throttling effect.

5. The method of claim 1, wherein if the client has not sent a request to the server, the method further comprises waiting a pre-determined number of time periods before adjusting the rate at which requests are sent to the server.

6. The method of claim 1, wherein adjusting the rate at which requests are sent to the server involves adjusting the rate such that the timeout percentage is greater than zero.

7. A non-transitory computer-readable storage medium storing instructions that when executed by a computer cause the computer to perform a method for facilitating self-tuning traffic shaping without a central traffic manager, the method comprising:
    sending one or more requests from a client to a server over a first specified period of time;
    receiving one or more responses to the one or more requests from the server over the first specified period of time;
    determining at the client a first request-timeout percentage for the server for the first specified period of time;
    adjusting a rate at which requests are sent to the server based on the first request-timeout percentage;
    sending one or more requests to the server over a second specified period of time;
    receiving one or more responses to the one or more requests from the server over the second specified period of time;
    determining a second request-timeout percentage for the second specified period of time;
    determining a throttling effect by analyzing the first request-timeout percentage, the second request-timeout percentage, and the rate at which requests are sent to the server; and
    adjusting the rate at which requests are sent to the server based on the second request-timeout percentage and the throttling effect.

8. The computer-readable storage medium of claim 7, wherein the method further comprises applying a decay function to the throttling effect, wherein the decay function reduces over time the influence of the throttling effect on the adjustment of the rate at which requests are sent to the server.

9. The computer-readable storage medium of claim 7, wherein the method further comprises adjusting a duration of a subsequent period of time for which a subsequent request-timeout percentage is determined based on the throttling effect.

10. The computer-readable storage medium of claim 7, wherein the method further comprises delaying a start of a subsequent period of time for which a subsequent request-timeout percentage is determined based on the throttling effect.

11. The computer-readable storage medium of claim 7, wherein if the client has not sent a request to the server, the method further comprises waiting a pre-determined number of time periods before adjusting the rate at which requests are sent to the server.

12. The computer-readable storage medium of claim 7, wherein adjusting the rate at which requests are sent to the server involves adjusting the rate such that the timeout percentage is greater than zero.

13. An apparatus configured to facilitate self-tuning traffic shaping without a central traffic manager, comprising:
    a memory; and
    one or more processors, wherein the one or more processors are configured to:
        send one or more requests from a client to a server over a first specified period of time;
        receive one or more responses to the one or more requests from the server over the first specified period of time;
        determine at the client a first request-timeout percentage for the server for the first specified period of time;
        adjust a rate at which requests are sent to the server based on the first request-timeout percentage;
        send one or more requests to the server over a second specified period of time;
        receive one or more responses to the one or more requests from the server over the second specified period of time;
        determine a second request-timeout percentage for the second specified period of time;

determine a throttling effect by analyzing the first request-timeout percentage, the second request-timeout percentage, and the rate at which requests are sent to the server; and further adjust the rate at which requests are sent to the server based on the second request-timeout percentage and the throttling effect.

14. The apparatus of claim 13, wherein the one or more processors are configured to apply a decay function to the throttling effect, wherein the decay function reduces over time the influence of the throttling effect on the adjustment of the rate at which requests are sent to the server.

15. The apparatus of claim 13, wherein the one or more processors are configured to adjust a duration of a subsequent period of time for which a subsequent request-timeout percentage is determined based on the throttling effect.

16. The apparatus of claim 13, wherein the one or more processors are configured to delay a start of a subsequent period of time for which a subsequent request-timeout percentage is determined based on the throttling effect.

17. The apparatus of claim 13, wherein the one or more processors are configured to wait a pre-determined number of time periods before adjusting the rate at which requests are sent to the server, if the client has not sent a request to the server.

* * * * *